(12) United States Patent
Seid et al.

(10) Patent No.: US 7,801,693 B2
(45) Date of Patent: Sep. 21, 2010

(54) FLUID PRESSURE MEASUREMENT

(75) Inventors: David L. Seid, Conklin, MI (US); Timothy M. Anderson, Muskegon, MI (US)

(73) Assignee: Saturn Electronics & Engineering, Inc., Auburn Hills, MI (US)

( * ) Notice: Subject to any disclaimer, the term of this patent is extended or adjusted under 35 U.S.C. 154(b) by 0 days.

(21) Appl. No.: 11/728,206

(22) Filed: Mar. 23, 2007

(65) Prior Publication Data

US 2007/0234812 A1    Oct. 11, 2007

Related U.S. Application Data

(60) Provisional application No. 60/785,706, filed on Mar. 24, 2006.

(51) Int. Cl.
*G01L 7/00*    (2006.01)

(52) U.S. Cl. .................. 702/98; 702/50; 702/100; 702/104; 702/105; 702/130; 702/138; 700/29; 700/282; 73/1.57; 73/23.25; 73/23.27; 73/204.19

(58) Field of Classification Search ............ 702/53, 702/50, 98, 104, 105, 62, 130, 133, 138, 702/100; 700/29, 282; 73/1.57, 700, 23.22, 73/23.25, 23.27, 1.63–1.69, 204.19; 324/721; 96/102

See application file for complete search history.

(56) References Cited

U.S. PATENT DOCUMENTS

| | | | | |
|---|---|---|---|---|
| 4,048,964 A | * | 9/1977 | Kissel | 123/482 |
| 4,576,035 A | * | 3/1986 | Hooven et al. | 73/1.59 |
| 4,586,383 A | * | 5/1986 | Blomquist | 73/706 |
| 5,524,084 A | * | 6/1996 | Wang et al. | 702/100 |
| 5,642,278 A | * | 6/1997 | Wang et al. | 700/29 |
| 5,867,031 A | * | 2/1999 | Wang | 324/721 |
| 6,850,832 B1 | * | 2/2005 | Rodriguez et al. | 701/104 |
| 7,266,986 B2 | * | 9/2007 | Shirley et al. | 73/1.57 |

* cited by examiner

*Primary Examiner*—Carol S Tsai

(57) ABSTRACT

A method and apparatus for improving accuracy of measurement of fluid pressure at a fluid port, such as at a supply port or control port of a fluid control valve, involves a closed-loop precision pressure measurement method with barometric pressure and temperature compensation.

15 Claims, 9 Drawing Sheets

FLUID PRESSURE MEASUREMENT

This application claims benefits and priority of provisional application Ser. No. 60/785,706 filed Mar. 24, 2006, the entire disclosure of which is incorporated herein by reference.

FIELD OF THE INVENTION

The present invention relates to measurement of fluid pressure and, in particular, to method and apparatus for measuring hydraulic pressure at a supply port or control port of a hydraulic fluid control valve in a manner that improves accuracy of the measurement.

BACKGROUND OF THE INVENTION

Hydraulic fluid control valves typically include a supply port for communication to a source of pressurized hydraulic fluid and a control port for communication to an end user of the hydraulic fluid. Measurement of the supply port pressure and control port pressure are conducted during calibration of the operation of the fluid control valve.

In the past, measurement of supply or control port pressures has used conventional gage transducers including a vented diaphragm. However, these pressure measurements suffer from inaccuracy as a result of the transducer's not compensating for barometric pressure, which can vary as much as 7 to 8 kPa for example, as well as a result of the transducer's having a very narrow range of linearity over a wide temperature range. Moreover, these transducers are susceptible to migration of foreign matter into the vent passage and resultant contamination of internal electronics.

SUMMARY OF THE INVENTION

The present invention provides a method and apparatus for improving accuracy of the measurement of fluid pressure at a fluid port, such as at a supply port or control port of a fluid control valve. The method provides a closed-loop precision pressure measurement method with barometric pressure compensation and temperature compensation in a manner to improve the accuracy of the pressure measurement.

An illustrative embodiment of the invention provides a method to this end wherein an absolute pressure transducer is mapped to a high resolution two dimensional (2D) voltage table for pressure versus temperature. For example, the absolute pressure transducer is mapped to a 2D voltage table for voltage versus temperature characteristics at different pressures and over a wide temperature range (e.g. −40 degrees C. to 90 degrees C.). For a given mapping point, a temperature voltage reading and barometric pressure voltage reading are collected.

A 2D mapping table is generated from each mapping point to map the pressure transducer for variation of overall voltage linearity over temperature as well as for any anomalies in the voltage slope. This transducer mapping occurs before taking an actual pressure measurement at a supply port and/or control port of a fluid control valve on a test stand.

Several look-up tables are generated from the mapping data to provide parameters that are embodied in a pressure accuracy algorithm to obtain a more accurate fluid pressure measurement $P_{FINAL}$ at a supply port or control port wherein the algorithm is:

$$P_{FINAL} = P_{RAW} - (P_{BAR\_ACT} - P_{BAR\_CAL}) + P_{OFFSET}$$

$P_{RAW}$ is obtained from a 2D (two dimensional) look-up table (see FIG. 3) of raw transducer pressure voltage signals ($V_P$) versus temperature voltage signals, TempRTD (also designated $T_{RTD}$ in FIGS. 2-3) where TempRTD (or $T_{RTD}$) is initially determined from a one dimensional (1D) look-up table (see FIG. 2) of transducer RTD (resistive temperature device) voltage versus temperature.

$P_{BAR\_ACT}$ is obtained from a 2D look-up table (see FIG. 8) of raw barometer pressure voltage signals ($V_{BP}$) versus barometer RTD temperature voltage signals, TempRTD (or $T_{RTD}$ in FIG. 8) at the time of actual pressure measurement at a fluid port of a fluid control valve on a test stand.

$P_{BAR\_CAL}$ is determined from a 1D look-up table (see FIG. 4) of barometric pressure voltage signals versus the barometer RTD temperature voltage signals at the time of mapping. The final measured fluid pressure $P_{FINAL}$ is adjusted using a delta of the actual barometric pressure reading taken at the given measurement moment to the calibrated barometric reading taken during mappings.

$P_{OFFSET}$ is an optional error compensation taken from an error compensation 1D lookup table (see FIG. 7) of averaged fluid pressure error offsets versus TempRTD (or $T_{RTD}$ in FIG. 7).

These and other features and advantages of the present invention will become more readily apparent from the following detailed description taken with the following drawings.

DETAILED DESCRIPTION OF THE INVENTION

Figure 1:
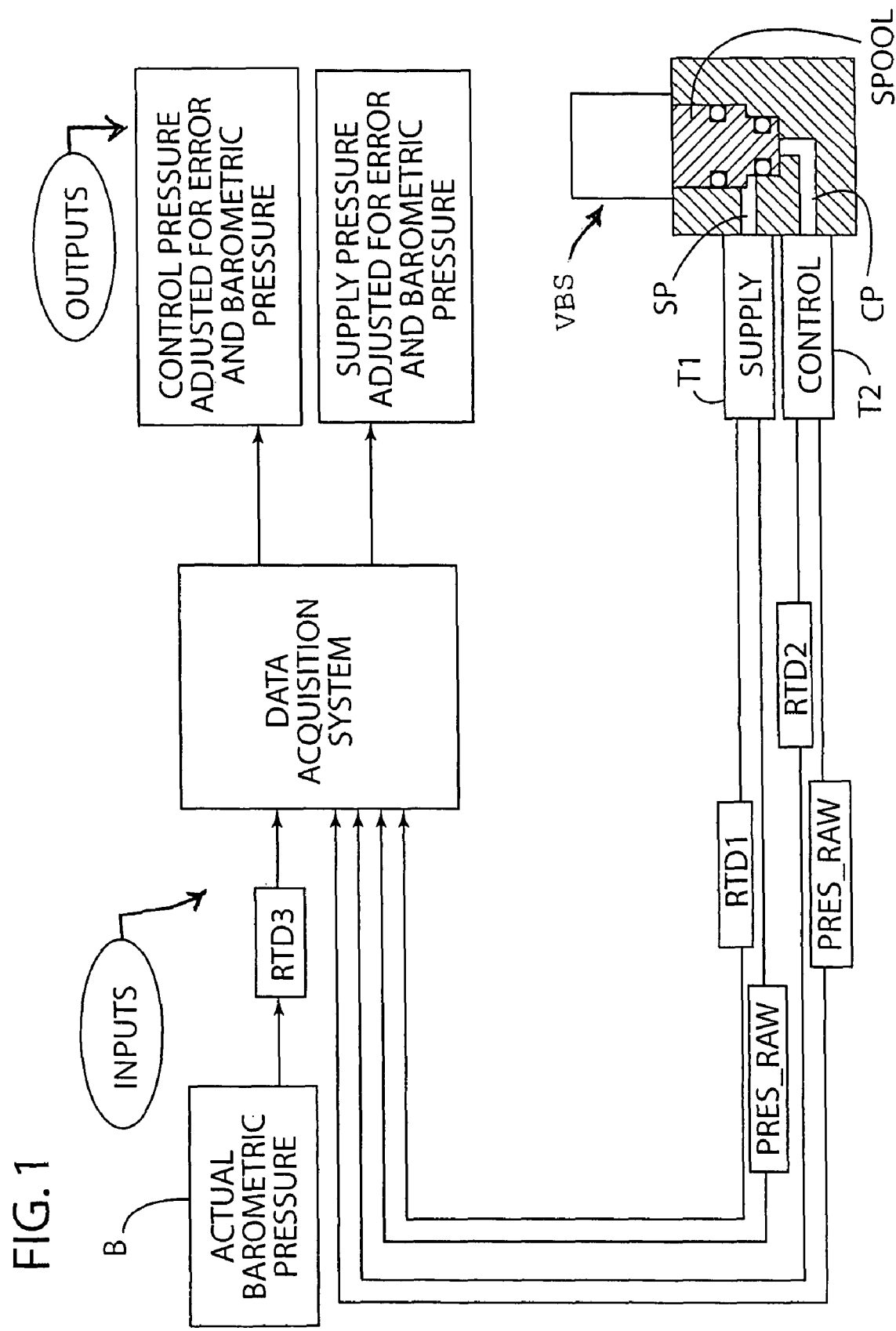
FIG. 1 is a schematic view of apparatus for making a pressure measurement pursuant to a method embodiment of the invention.

Referring to FIG. 1, apparatus for making a precision pressure measurement at a supply port SP and control CP of a schematically shown variable bleed solenoid VBS having optional valve spool pursuant to a method embodiment of the invention is illustrated for purposes of illustration and not limitation. The invention is not limited to measuring pressure at a fluid port of a variable bleed solenoid and can be used in connection with others types of fluid control valves. A method embodiment of the invention provides a closed-loop precision pressure measurement method with barometric pressure and temperature compensation in a manner to improve the accuracy of the pressure measurement. The method of the invention is advantageous to make high precision pressure measurements that require measurement accuracy below 20 kPa, where past pressure measurement techniques could be drastically affected by changes in barometric pressure that can vary by as much as 7 to 8 kPa.

A data acquisition system, such as a conventional data acquisition industrial computer system, receives voltage signal inputs from an absolute pressure transducer T1 (pressure sensor) at the supply port SP and from a resistive temperature device RTD1 for measuring temperature of the transducer T1 as illustrated in FIG. 1. The data acquisition system also receives voltage signal inputs from absolute pressure transducer T2 (pressure sensor) at the control port CP and from a resistive temperature device RTD2 for measuring temperature of the transducer T2. The transducers T1, T2 can comprise Spectre Model 1500 absolute pressure transducers available from Spectre Sensors, Inc., 1651-D Crossings Parkway, Westlake, Ohio 44145, for purposes of illustration and not limitation. The resistive temperature devices RTD 1 and RTD 2 can be conventional resistive temperature devices available from Spectre Sensors, Inc. and can be integral with the respective transducers T1 and T2, or separate therefrom. Supply port receives fluid pressure from a conventional fluid pressure source, such as an oil pump. A conventional precision barometer B measures barometric pressure and also provides voltage signal inputs. The barometer includes its own resistive temperature device RTD3 for measuring barometer temperature.

The data acquisition system outputs a control pressure measurement adjusted for barometric pressure and temperature and outputs supply pressure measurement adjusted for barometric pressure and temperature as will become apparent below. For example, the data acquisition system can output a control and/or supply pressure measurement to a visual display for viewing, a printer for printing the output for viewing, and/or to computer system memory for storage and use of the output pressure values.

In an illustrative embodiment of the invention, the method provides a closed-loop precision pressure measurement method with barometric pressure compensation, temperature compensation, and other error compensation using an algorithm to improve the accuracy of the pressure measurement.

An illustrative embodiment of the invention provides a method to this end wherein the absolute pressure transducers T1 and T2 are mapped to a high resolution 2D voltage table for pressure versus temperature. For example, each absolute pressure transducer is mapped to a 2D voltage table for voltage versus temperature characteristics at different barometric pressures and over a wide temperature range (e.g. −40 degrees C. to 90 degrees C.). For a given mapping point, an RTD voltage reading and barometric pressure voltage reading are collected.

A 2D mapping table is generated for the pressure transducer T1 and T2 to map each pressure transducer for variation of overall voltage linearity over temperature as well as for any anomalies in the voltage slope.

Several look-up tables are generated from the mapping data and are stored in memory of the computer system from which look-up tables parameters that are embodied in a pressure accuracy algorithm stored in the computer system can be obtained to provide a more accurate fluid pressure measurement $P_{FINAL}$ at supply port SP and control port CP wherein the algorithm is:

$$P_{FINAL} = P_{RAW} - (P_{BAR\_ACT} - P_{BAR\_CAL}) + P_{OFFSET}$$

For example, $P_{RAW}$ is obtained from a look-up table (see Lookup Table B of FIG. 3) of raw transducer pressure voltage signals ($V_P$) versus temperature voltage signals, TempRTD (also designated $T_{RTD}$ in FIGS. 2-3) where TempRTD (or $T_{RTD}$) is initially determined from a 1D look-up table (see Lookup Table A of FIG. 2) of transducer RTD voltage ($V_{RTD}$) versus temperature ($T_{RTD}$).

Figure 8:
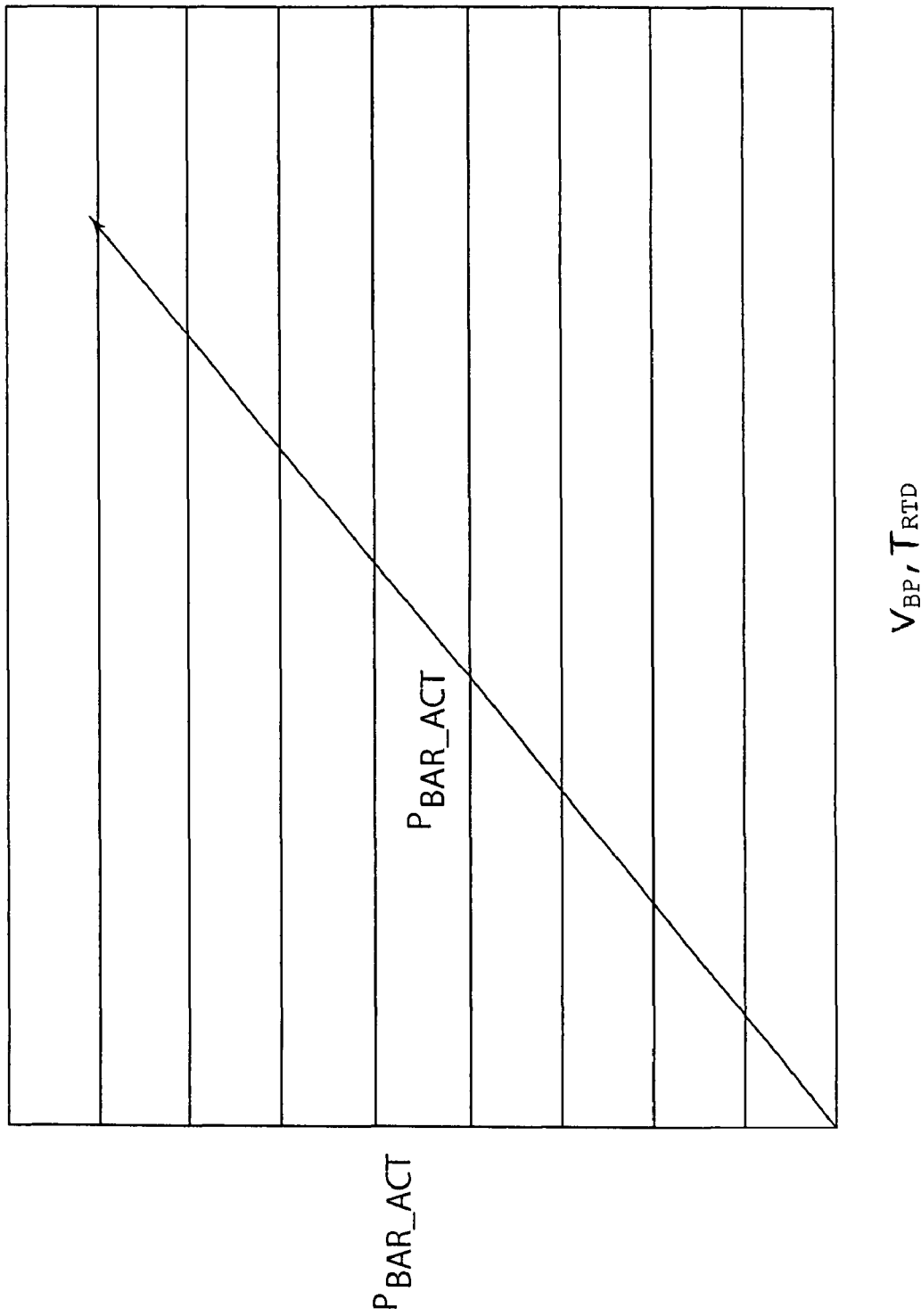

$P_{BAR\_ACT}$ is obtained from a 2D look-up table (see Lookup Table E of FIG. 8) of raw barometer pressure voltage signals ($V_{BP}$) versus barometer RTD temperature voltage signals, TempRTD (or $T_{RTD}$ in FIG. 8) at the time of actual pressure measurement at a fluid port of the variable bleed solenoid VBS on a test stand.

$P_{BAR\_CAL}$ is determined from a 1D look-up table (see Lookup Table C of FIG. 4) of barometric pressure voltage signals versus the barometer RTD temperature voltage signals ($T_{RTD}$ in FIG. 4) at the time of mapping the transducer. The final measured fluid pressure $P_{FINAL}$ is adjusted using a delta of the actual barometric pressure reading taken at the given measurement moment on the test stand to the calibrated barometric reading taken during previous mapping of the transducer.

Figure 7:
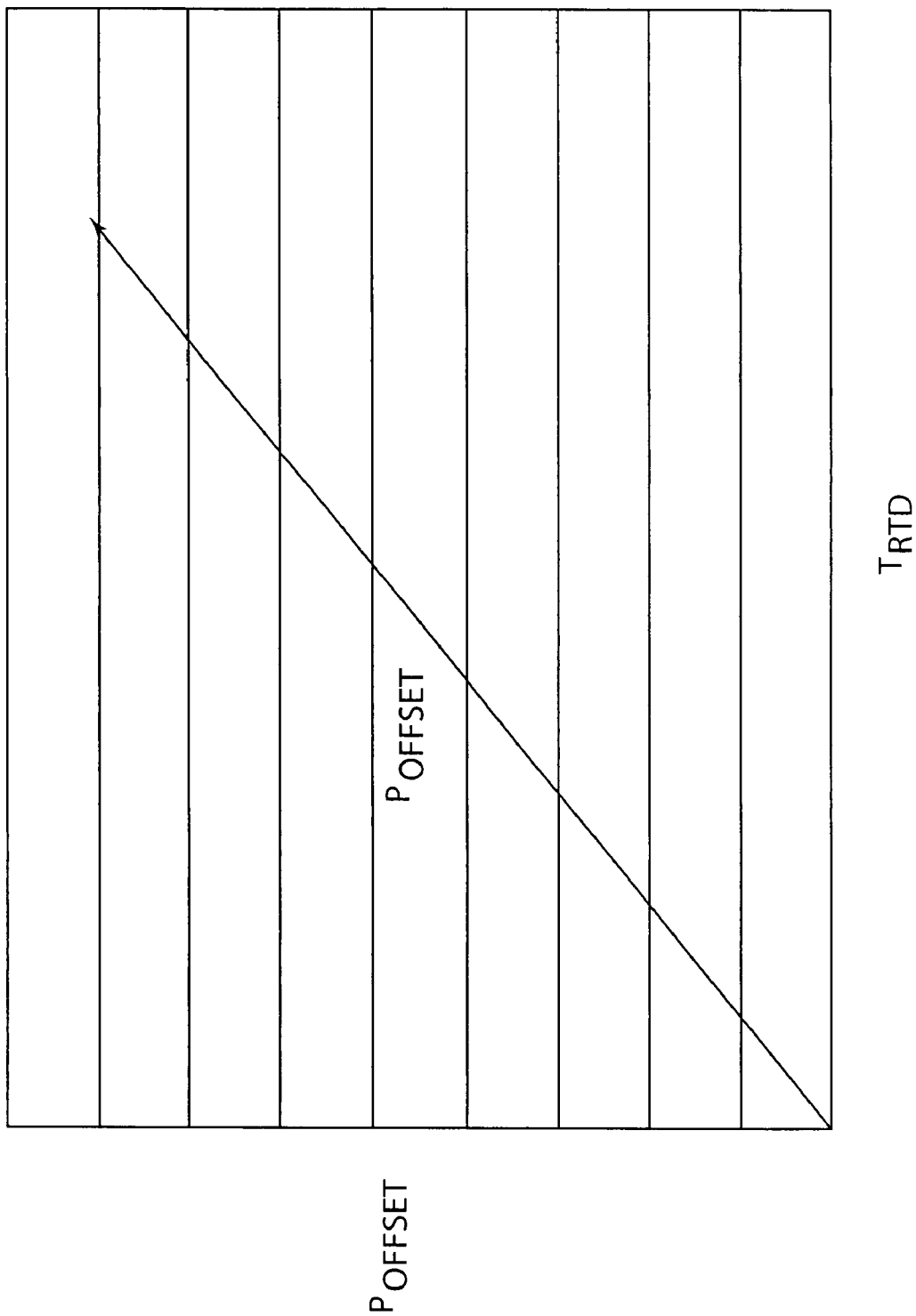
FIGS. 7 and 8 illustrate look-up tables.

$P_{OFFSET}$ is an optional error compensation taken from an error compensation 1D lookup table (see Lookup Table D of FIG. 7) of averaged fluid pressure error offsets versus TempRTD (or $T_{RTD}$ in FIG. 7).

The following Example is offered for purposes of illustration and not limitation and describes a method embodiment in more detail:

EXAMPLE

Transducer

Figure 9:
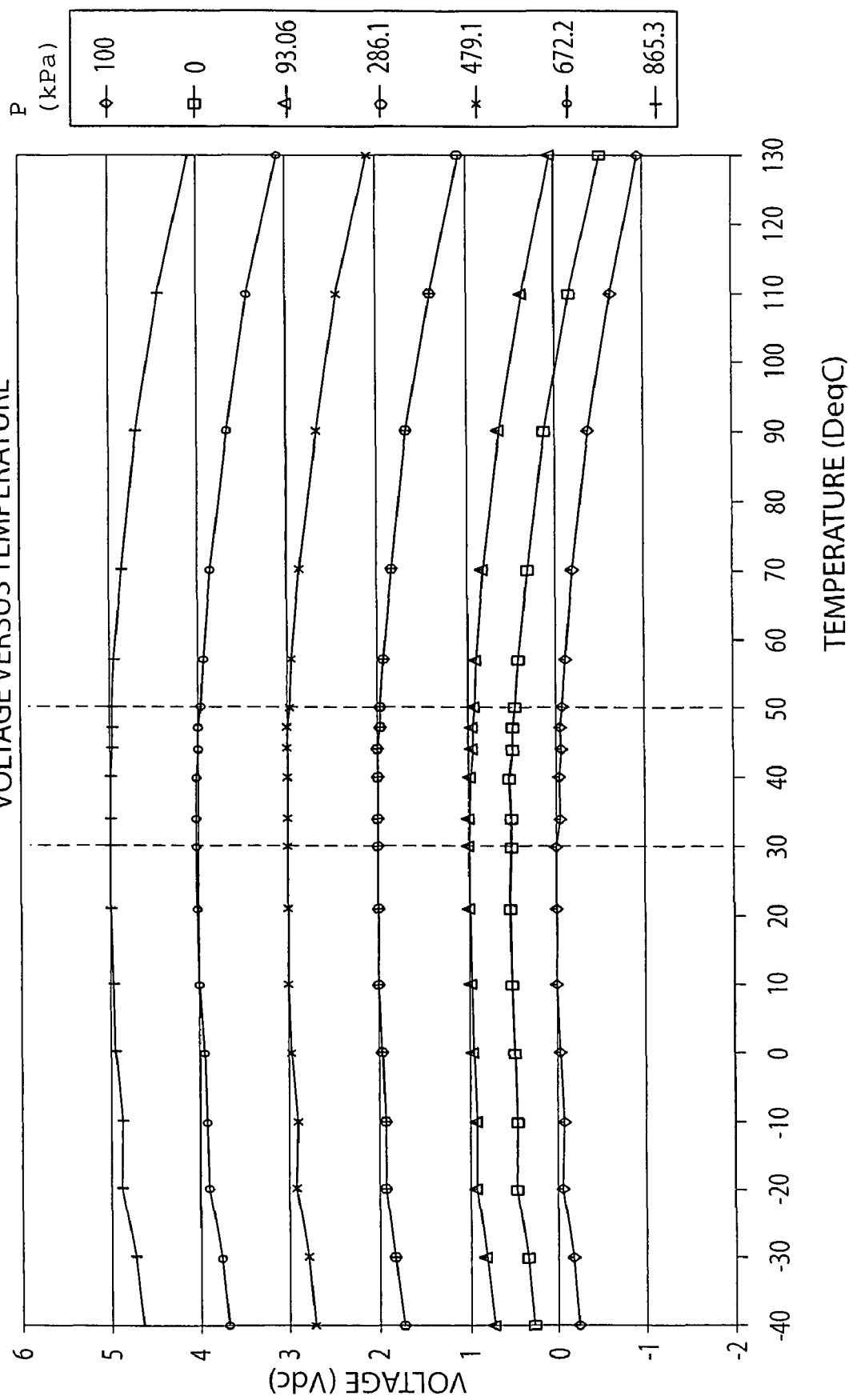
FIG. 9 is a graph of transducer voltage versus temperature at different pressures showing typical voltage non-linearity for a particular pressure transducer.

For purposes of illustration and not limitation, an absolute pressure transducer with an output voltage range that maximizes the voltage slope is employed. The pressure transducer is a Spectre Model 1500 absolute pressure transducer available from Spectre Sensors, Inc., 1651-D Crossings Parkway, Westlake, Ohio 44145. In addition, a RTD (Resistive Temperature Device) is installed in the transducer circuit (either integral to the transducer or directly adjacent to the transducer) as shown in FIG. 1. The RTD (e.g. RTD1, RTD2) provides an effective means of continuously monitoring transducer temperature (or RTD3 for barometer temperature) and also provides accurate feedback for the accuracy algorithm. FIG. 9 is a graph of transducer voltage versus temperature at different pressures for a particular pressure transducer showing typical voltage non-linearity.

Figure 6:
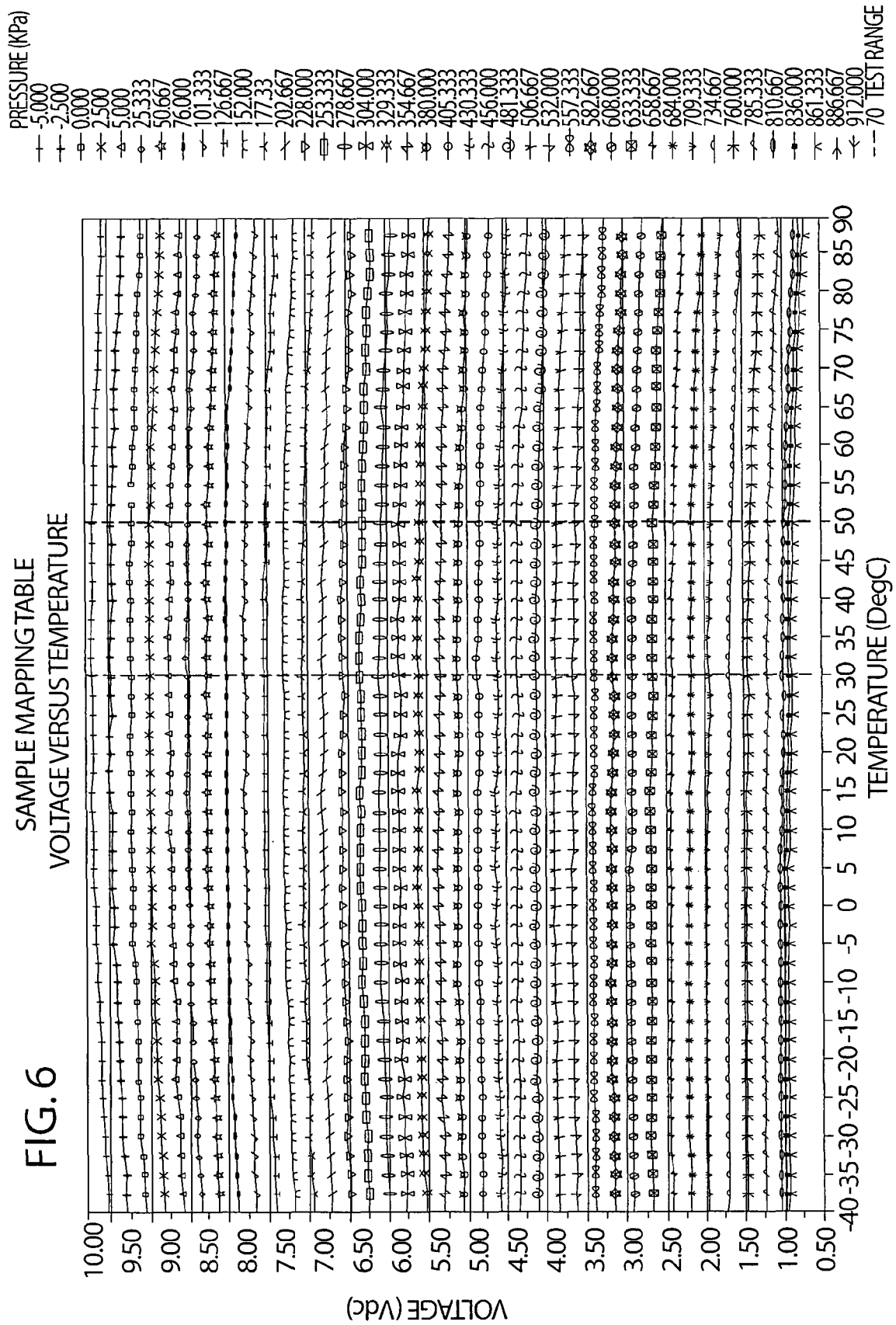
FIG. 6 shows an exemplary mapping table of transducer voltage versus temperature for a particular pressure transducer.

High Precision Transducer/RTD Mapping:

Each specific pressure transducer and barometer is "mapped" to a very high resolution 2D voltage table for pressure versus temperature. For example, a table of fifty (50) temperatures from −40° C. to 90° C. and forty (40) pressures from −5 to 912 kPa is used. For each given mapping point, a RTD voltage and barometric pressure reading (from precision barometer B) are collected. This high resolution table maps each sensor for variation in overall voltage linearity over temperature as well as any anomalies in the voltage slope. For example, see mapping table for a pressure transducer shown in FIG. 6.

Figure 2:
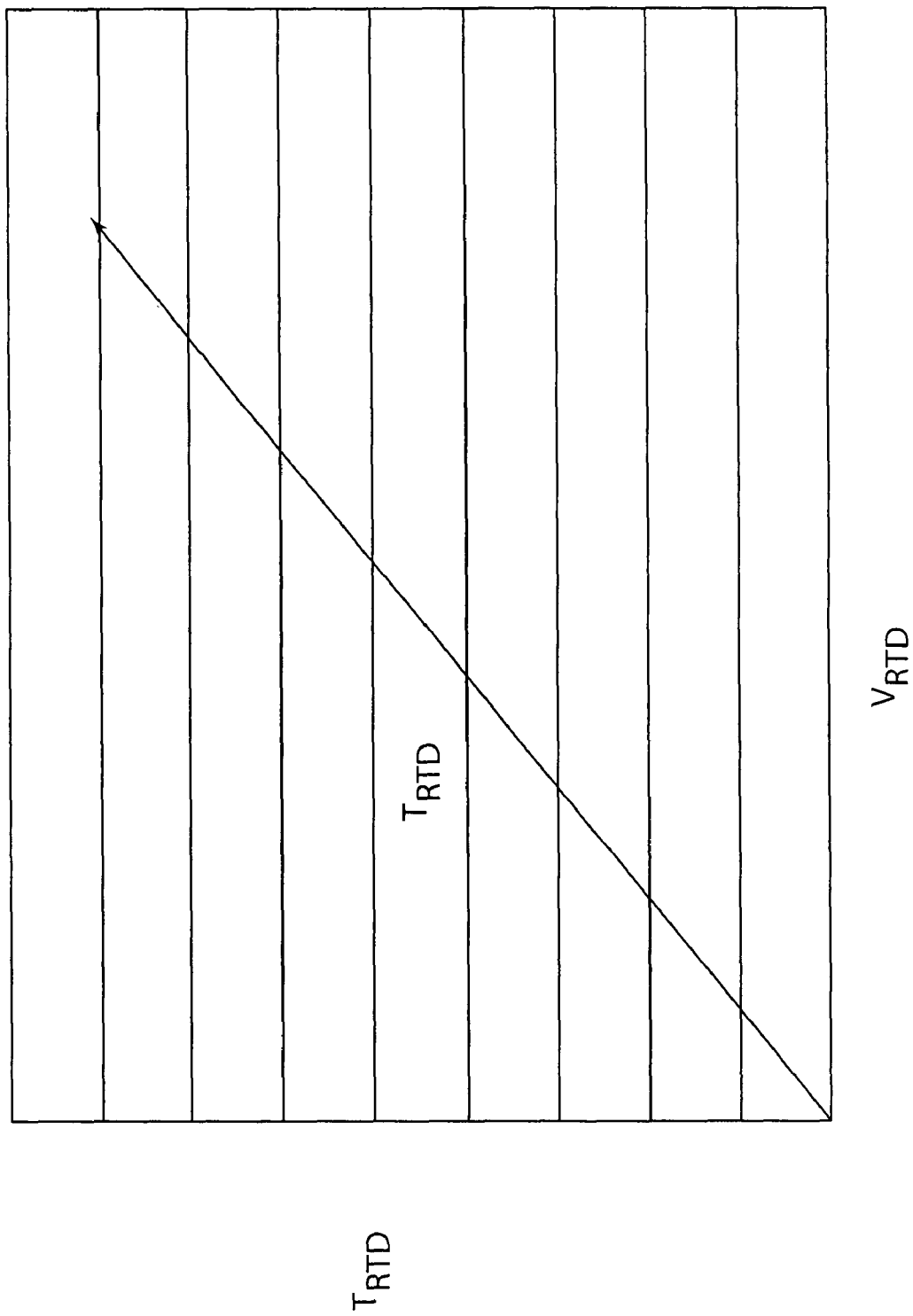
FIGS. 2, 3, and 4 illustrate look-up tables.

Initial Lookup Tables:

Using all the data collected in mapping stages, several key lookup tables are generated from the data; namely:

TempRTD versus VoltageRTD (Output of Lookup Table=TempRTD) (e.g. FIG. 2)

Figure 3:
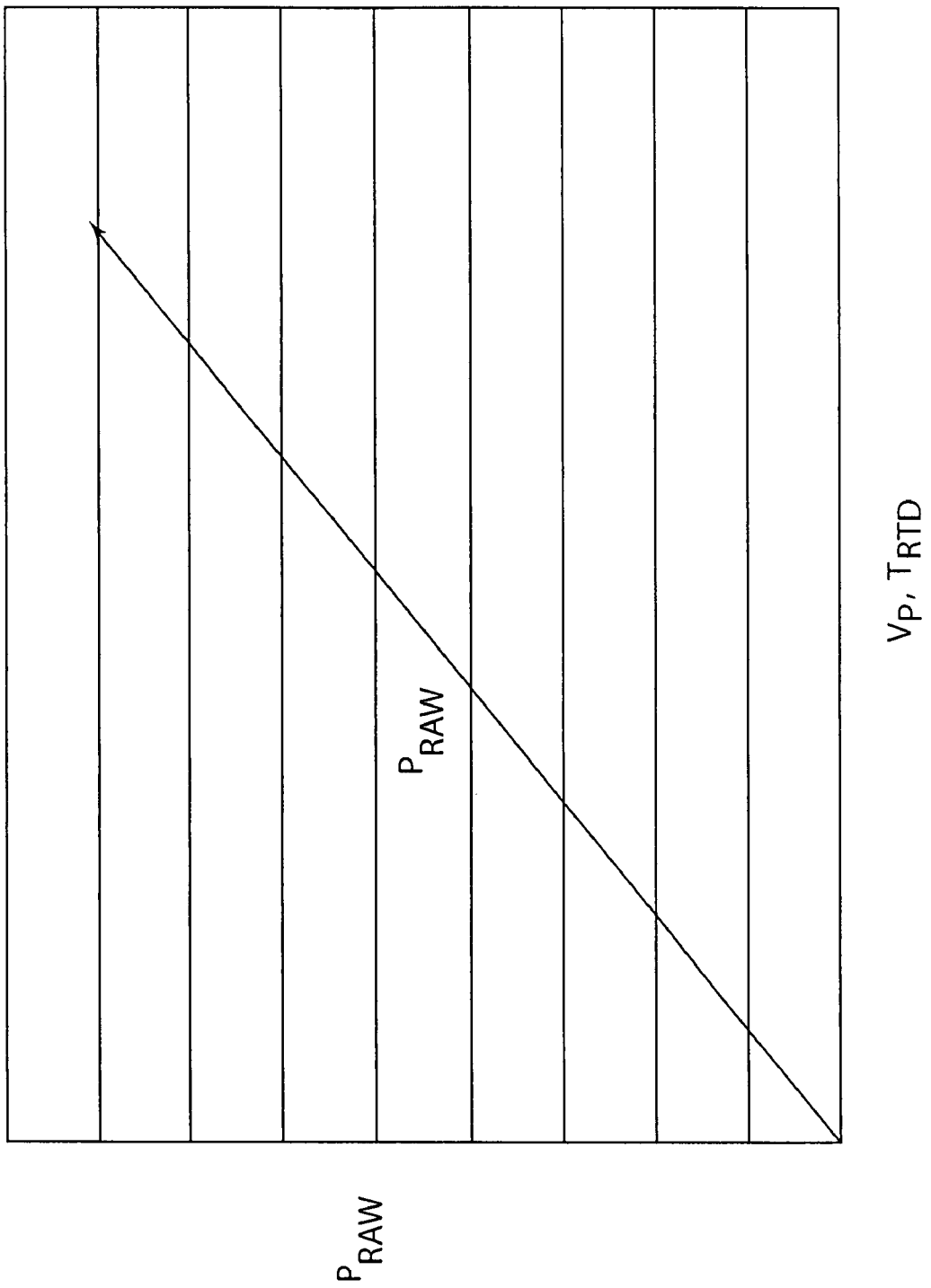

VoltagePres_Raw versus TempRTD (Output of Lookup Table=Press_Raw) (e.g. FIG. 3)

Figure 4:
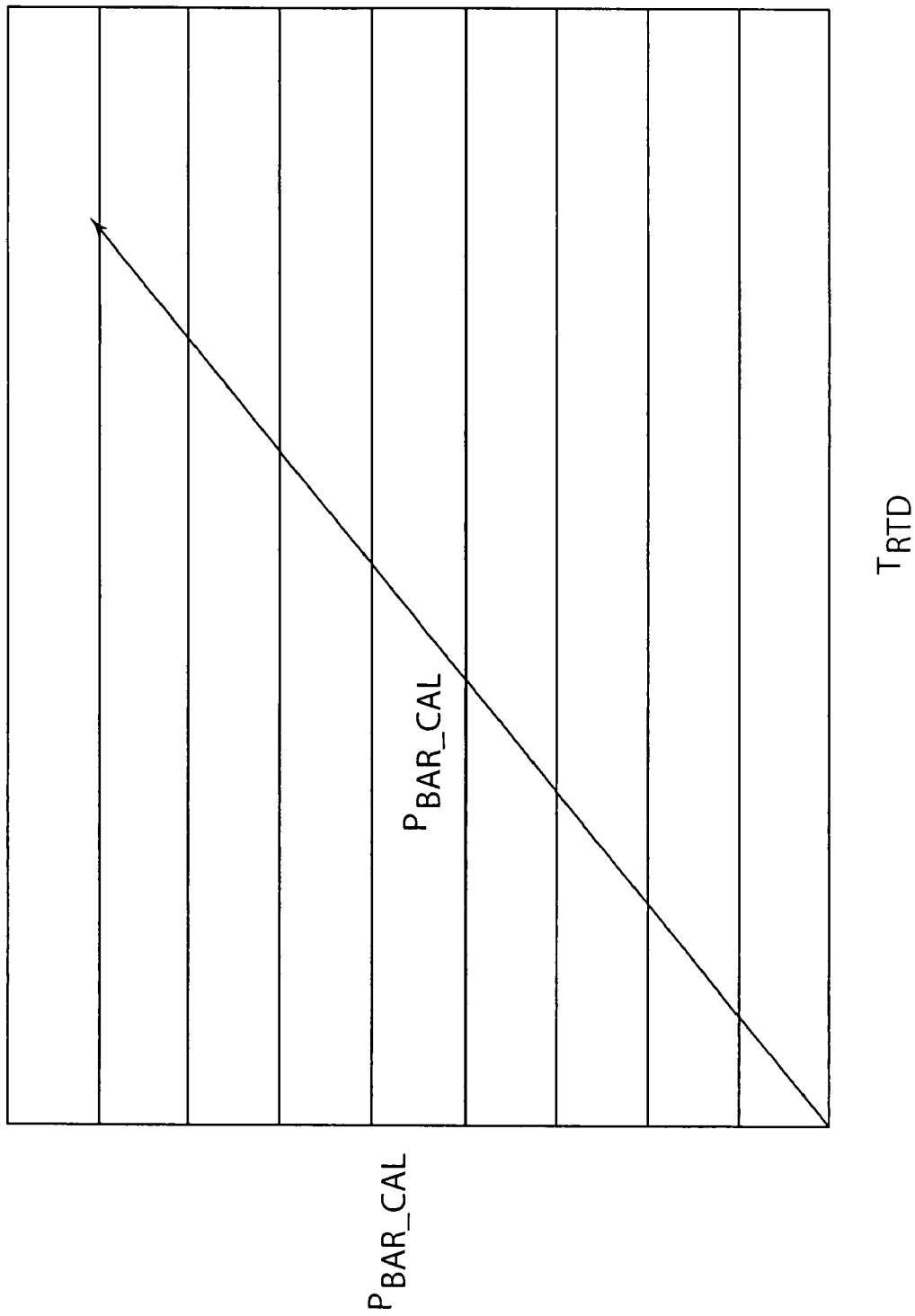

PresBar_Cal versus TempRTD (Output of Lookup Table=PressBar_Cal) (e.g. FIG. 4)

Readings are interpolated from high resolution tables, which minimizes error and compensates for irregularities in voltage transfer function (unlike normal linear pressure transducer calibrations). This allows precision measurements across much wider temperature spectrums.

Error Compensation (Generate Offsets):

Once the lookup tables are generated, initial accuracy measurements can be collected to verify lookup table mapping. For purposes of illustration and not limitation, one can run eight (8) series of accuracy measurements and various strategic temperatures. The deltas (differences) between actual and calibration command of the eight (8) runs are averaged and error compensation offsets are generated for each command. These offsets with their corresponding actual RTD readings are used to generate the additional (optional) error compensation lookup table:

P_OFFSET versus T_RTD (Output of Lookup Table=P_OFFSET) (e.g. FIG. 7)

Closed-Loop Barometric Pressure Compensation:

During real-time data acquisition, the barometer RTD is monitored and a closed-loop barometric pressure reading is collected.

TempRTD versus VoltageRTD (Output of Lookup Table=TempRTD) for barometer

The final pressure value is adjusted using a calculated delta (difference) of the actual barometric pressure reading (at that given moment) to the calibrated barometric reading (taken during mapping) as shown below in the final pressure ($P_{FINAL}$) equation below:

$$P_{FINAL} = P_{RAW} - (P_{BAR\_ACT} - P_{BAR\_CAL}) + P_{OFFSET} \text{ FINAL EQUATION}$$

Figure 5:
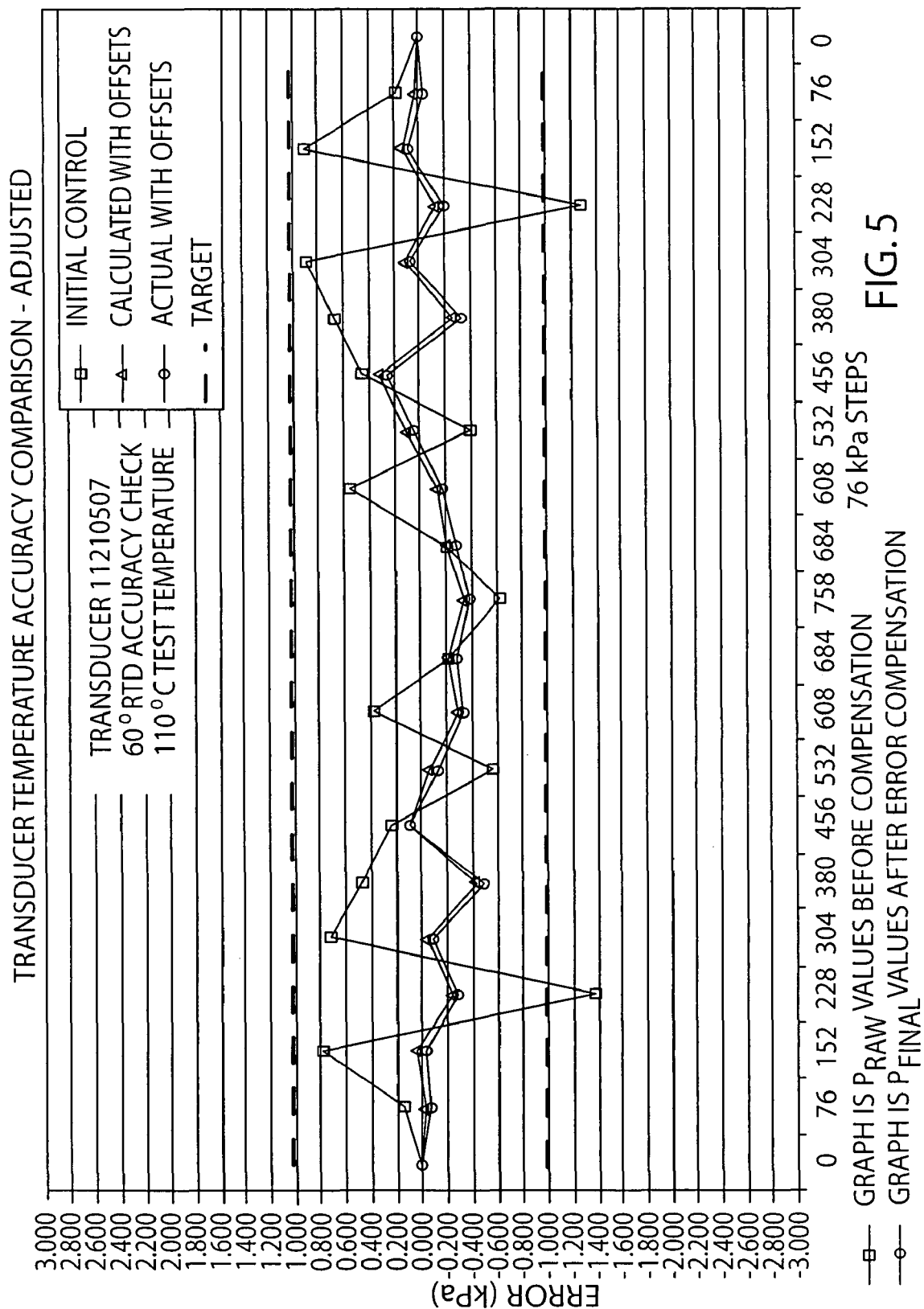
FIG. 5 illustrates a pressure transducer temperature accuracy comparison with actual error compensation where error is plotted versus pressure changes in 76 kPa steps at a test temperature of 110 degrees C.

FIG. 5 illustrates a pressure transducer temperature accuracy comparison with actual error compensation where error is plotted versus pressure changes in 76 kPa step increments at a test temperature of 110 degrees C. The $P_{FINAL}$ values after error compensation (offsets) represented by open circle data points are in agreement with calculated values represented by triangular data points. Control $P_{RAW}$ data points are represented by the open square data points.

Although certain embodiments of the invention have been described in detail above, those skilled in the art will appreciate that changes and modifications can be made thereto without departing from the spirit and scope of the invention as set forth in the appended claims.

We claim:

1. Method of measuring fluid pressure at a fluid port, comprising measuring fluid pressure at the fluid port using a pressure sensor, measuring temperature of the pressure sensor, measuring barometric pressure, determining a final fluid pressure with a barometric pressure compensation and temperature compensation, and providing the determined final fluid pressure to one or more of a visual display, a printer, or a data storage.

2. The method of claim 1 including determining the final fluid pressure using:

$$P_{FINAL} = P_{RAW} - (P_{BAR\_ACT} - P_{BAR\_CAL}) + P_{OFFSET}$$

and providing the determined final fluid pressure to one or more of a visual display, a printer, or a data storage.

3. Method of measuring fluid pressure at a fluid port, comprising measuring fluid pressure at the fluid port using a pressure transducer, measuring temperature of the pressure transducer, measuring barometric pressure, determining a final fluid pressure with a barometric pressure compensation and temperature compensation, and providing the determined final fluid pressure to one or more of a visual display, a printer, or a data storage.

4. The method of claim 1 including determining the final fluid pressure using:

$$P_{FINAL} = P_{RAW} - (P_{BAR\_ACT} - P_{BAR\_CAL}) + P_{OFFSET}$$

and providing the determined final fluid pressure to one or more of a visual display, a printer, or a data storage.

5. The method of claim 1 including mapping the pressure sensor for variation of overall voltage linearity over temperature.

6. The method of claim 5 including mapping the pressure sensor to a voltage table for pressure versus temperature.

7. The method of claim 6 including for a given mapping point, collecting a temperature voltage reading and barometric pressure voltage reading.

8. The method of claim 5 including generating look-up tables from mapping data.

9. Apparatus for measuring pressure at a fluid port, comprising an absolute pressure transducer, a device for measuring temperature of the pressure transducer, a barometer, and computer system having an algorithm:

$$P_{FINAL} = P_{RAW} - (P_{BAR\_ACT} - P_{BAR\_CAL}) \, P_{OFFSET}$$

to determine a final fluid pressure with barometric pressure compensation and temperature compensation to improve the accuracy.

10. Method of measuring fluid pressure at a fluid port, comprising mapping a pressure sensor to a voltage table for pressure versus temperature characteristics at different barometric pressures and over a temperature range of –40 degrees C. to 90 degrees C., measuring fluid pressure at the fluid port using the pressure sensor, measuring temperature of the pressure sensor, measuring barometric pressure, determining a final fluid pressure using barometric pressure compensation and temperature compensation, and providing the determined final fluid pressure to one or more of a visual display, a printer, or a data storage.

11. Method of measuring fluid pressure at a fluid port, comprising mapping a pressure sensor for variation of overall voltage linearity over temperature including generating a look-up table of raw transducer pressure voltage signals versus temperature voltage signals, measuring fluid pressure at the fluid port using the pressure sensor, measuring temperature of the pressure sensor, measuring barometric pressure, determining a final fluid pressure using barometric pressure compensation and temperature compensation, and providing the determined final fluid pressure to one or more of a visual display, a printer, or a data storage.

12. Method of measuring fluid pressure at a fluid port, comprising mapping a pressure sensor for variation of overall voltage linearity over temperature including generating a look-up table of resistive temperature device voltage signals versus temperature, measuring fluid pressure at the fluid port using the pressure sensor, measuring temperature of the pressure sensor, measuring barometric pressure, determining a final fluid pressure using barometric pressure compensation and temperature compensation, and providing the determined final fluid pressure to one or more of a visual display, a printer, or a data storage.

13. Method of measuring fluid pressure at a fluid port, comprising mapping a pressure sensor for variation of overall voltage linearity over temperature including generating a look-up table of barometric pressure voltage signals versus barometer temperature at the time of mapping the barometer, measuring fluid pressure at the fluid port using the pressure sensor, measuring temperature of the pressure sensor, measuring barometric pressure, determining a final fluid pressure using barometric pressure compensation and temperature compensation, and providing the determined final fluid pressure to one or more of a visual display, a printer, or a data storage.

14. Method of measuring fluid pressure at a fluid port, comprising mapping a pressure sensor for variation of overall voltage linearity over temperature including generating a look-up table of raw barometric pressure voltage signals versus barometer temperature, measuring fluid pressure at the fluid port using the pressure sensor, measuring temperature of the pressure sensor, measuring barometric pressure, determining a final fluid pressure using barometric pressure compensation using the look-up table and temperature compensation, and providing the determined final fluid pressure to one or more of a visual display, a printer, or a data storage.

15. Method of measuring fluid pressure at a fluid port, comprising measuring fluid pressure at the fluid port using a pressure sensor, measuring temperature of the pressure sensor, measuring barometric pressure, determining a final fluid pressure using barometric pressure compensation and temperature compensation including adjusting the measured fluid pressure using a delta of the actual barometric pressure reading taken at the given measurement moment on a test stand to a calibrated barometric pressure reading taken during previous mapping of the pressure sensor, and providing the adjusted fluid pressure to one or more of a visual display, a printer, or a data storage.

* * * * *